United States Patent
Drinkwater

(10) Patent No.: US 6,701,951 B1
(45) Date of Patent: Mar. 9, 2004

(54) MANUAL TO ELECTRONIC AUTOMATIC VALVE CONVERSION APPARATUS

(76) Inventor: Don Lovis Drinkwater, 235 Fiske St., Carlisle, MA (US) 01741

( * ) Notice: Subject to any disclaimer, the term of this patent is extended or adjusted under 35 U.S.C. 154(b) by 38 days.

(21) Appl. No.: 09/669,495

(22) Filed: Sep. 25, 2000

Related U.S. Application Data

(60) Provisional application No. 60/159,583, filed on Oct. 18, 1999.

(51) Int. Cl.[7] .............................................. F16K 37/00
(52) U.S. Cl. ...................... 137/78.1; 137/357; 137/552; 137/624.12; 251/129.11; 251/292
(58) Field of Search .................................. 137/291, 292, 137/357, 552, 624.12, 78.1, 797; 251/129.11, 129.04, 248

(56) References Cited

U.S. PATENT DOCUMENTS

| | | | |
|---|---|---|---|
| 4,131,133 A | * 12/1978 | Huwe ..................... 137/624.11 |
| 4,313,595 A | 2/1982 | Markley |
| 4,629,157 A | * 12/1986 | Tsuchiya et al. .............. 251/96 |
| 4,705,063 A | 11/1987 | Robinson |
| 4,719,939 A | 1/1988 | Killian |
| 4,887,634 A | 12/1989 | Killian |
| 4,921,012 A | * 5/1990 | Bratten ........................ 137/599 |
| 5,004,014 A | * 4/1991 | Bender .................... 137/624.12 |
| 5,038,820 A | * 8/1991 | Ames et al. ................. 137/486 |
| 5,086,526 A | * 2/1992 | Marcke .......................... 4/623 |
| 5,086,806 A | * 2/1992 | Engler et al. ................. 137/486 |
| 5,409,037 A | * 4/1995 | Wheeler et al. ............. 137/551 |
| 5,564,461 A | 10/1996 | Raymond |
| 5,568,825 A | * 10/1996 | Faulk ..................... 137/624.11 |
| 5,570,869 A | * 11/1996 | Diaz et al. .............. 251/129.04 |
| 5,634,486 A | 6/1997 | Hatting |
| 5,954,088 A | 9/1999 | Huang |
| 6,065,735 A | * 5/2000 | Clark ..................... 251/129.03 |
| 6,070,852 A | * 6/2000 | McDonnell et al. ... 251/129.11 |

* cited by examiner

Primary Examiner—A. Michael Chambers
(74) Attorney, Agent, or Firm—Maine & Asmus

(57) ABSTRACT

A device and method to implement the device, to automatically adjust a single valve or a plurality of valves including turning the valve(s) on and off. The device includes a motor drive assembly, a mounting method, and a control method. Each component is discrete. The three components can be combined easily. The motor drive and control components can be mounted and connected to a valve that is currently connected to pipes. Thus one application of this invention is to provide a method to convert a manual valve to an automatic valve.

The control method can operate as a means to turn the valve on and off using a manually operated switch or can be automatically controlled in response to an external stimulus.

The invention has many applications including protecting real property from loss due to water damage, and against vandalism in cases where valves can be controlled by unauthorized people.

17 Claims, 17 Drawing Sheets

MANUAL TO ELECTRONIC AUTOMATIC VALVE CONVERSION APPARATUS (This application claims the benefit of U.S. Provisional Application No. 60/159,583 filed on Oct. 18, 1999.)

FIELD OF THE INVENTION

The invention is related to the field of converting a standard manually controlled valve into an electronically controlled automatic valve. One application of the automatic valve is to protect real property against water damage that can occur when a water conduit breaks. Thus the invention is also related to the field of protecting property against water damage. Although not limited to, the invention is particularly useful towards minimizing the damage that can occur if a water supply pipe or other water supply component freezes or breaks, or an appliance, such as a washing machine, dishwasher, ice maker, boiler, and water heater breaks. The invention is also related to the field of protecting real property against damage or excess water usage when outdoor spigots (valves) are left on or hoses break. Among other advantages, when used this way, the invention will serve to conserve water.

BACKGROUND OF THE INVENTION

Replacing a manually controlled valve with an electronically controlled automatic valve requires installing the valve on to an existing water supply conduit. In most cases, this requires a plumber or other person skilled at making such an installation. The cost to install an electronically controlled valve may exceed the cost of the valve. A method to easily and inexpensively convert a manually controlled valve into an automatic valve would provide a valuable solution to many applications.

Real property damage occurs when water supply pipes and other components break. A break can be caused by a variety reasons including freezing. Hoses that supply washing machines, dishwashers, and other appliances are particularly susceptible to breakage. The appliances can also break causing water to leak or gush. Water heaters wear out over time and are prone to leak or break suddenly.

A water supply break can cause substantial damage to property, especially if the property is not occupied during the time the break occurs. A device that can be added inexpensively and easily to shut off the water supply to a property or to an appliance located at the property and can be controlled to shut of the water under a variety of conditions would serve to minimize the damage to a property.

Another problem faced by property owners is the control of outdoor water supplies. Unauthorized people can turn on outdoor spigots allowing water to run for indefinite periods of time. Hoses can also break allowing large amounts of water to be wasted. A device that can control outdoor water sources from within the property and can be controlled automatically will serve to protect against such losses and provide a convenient means to control water used for outdoor activities.

SUMMARY OF THE INVENTION

It is therefore an object of the invention to provide a method and apparatus to convert a manually controlled valve into an automatically controlled valve that is responsive to an electronic controller.

The invention can be used to easily and inexpensively convert a variety of standard off the shelf valves such as ball valves, gate valves and valves that use washers into electronically controlled automatic valves. The automatic valve can be turned on or off locally or remotely. The automatic valve can be controlled to turn on or off based upon a variety of conditions using sensors.

It is also an object of the invention to control a valve assembly comprising two or more valves such as the valve assembly used to supply hot and cold water to an appliance, for example a washing machine.

It is also an object of the invention to provide a method and apparatus that will minimize the damage caused if a pipe or other water supply component breaks.

It is also the object of the invention to provide a method and apparatus that will control an outdoor water supply to prevent unauthorized use or minimize the water wasted when an outdoor hose breaks.

This and other objects are achieved according to the invention by a valve control device that is easily mounted to an existing manually controlled valve. The valve control device includes a motor, a means to increase torque and decrease revolutions per minute of the motor, a means to transfer torque from the motor or any torque/rpm conversion device to a valve without physically relocating the valve, and a means to secure the valve control device to the controlled valve. The valve control device turns the valve on or off based upon a variety of external conditions. The valve control device can be used in a variety of applications including but not limited to 1. Controlling the main water supply valve of a building so that water is shut off when the building is unoccupied and does not require water, 2. Controlling the water supply line that supplies water to an outdoor water supply, and 3. Controlling the hot and cold water valves that supply water to an appliance.

In the first case, the valve control device is fastened to the main water supply valve of a building. The valve control device turns the water supply off when no occupancy is sensed in the building for a predetermined period of time. Alternatively, the valve control device turns the water on for a predetermined period of time whenever occupancy is sensed. Occupancy sensing can be accomplished using a variety of methods including but not limited to acoustic sensing, infrared sensing, and visual sensing.

In the second case, the valve control device is fastened to the valve located inside a building that controls water to an outside water supply. The valve control device turns the water-on for a predetermined period of time based upon the users needs.

In the third case, the valve control device is fastened to one or more valves that supply water to an appliance. The valve control device turns the water on only when the water is needed to operate the appliance.

The above and other objectives are also achieved according to the invention by a method of controlling a valve that controls liquid flow.

In one embodiment, the method comprises the steps of
1. Sensing whether a building is occupied, and
2. Turning the valve off after a predetermined period of time after occupancy is no longer sensed or alternatively turning the valve on for a predetermined period of time after occupancy is sensed.

In a second embodiment, the method comprises the steps of:
1. Sensing through a human user interface that the user wants to turn on the valve, and
2. Turning on the valve for a period of time selected by the user or as required to serve a purpose such a watering a lawn.

In a third embodiment, the method comprises the steps of:
1. Sensing through a human interface or electronic interface that the appliance is on and requires water,
2. Turning on the valves that supply water to the appliance, and
3. Turning off the valves when the appliance no longer requires water either through a human interface, through a timer mechanism, or through sensing that the appliance no longer requires water.

BRIEF DESCRIPTION OF THE DRAWINGS

FIG. 8 also shows a detail of the drive connecting system.

DETAILED DESCRIPTION

Figure 1:
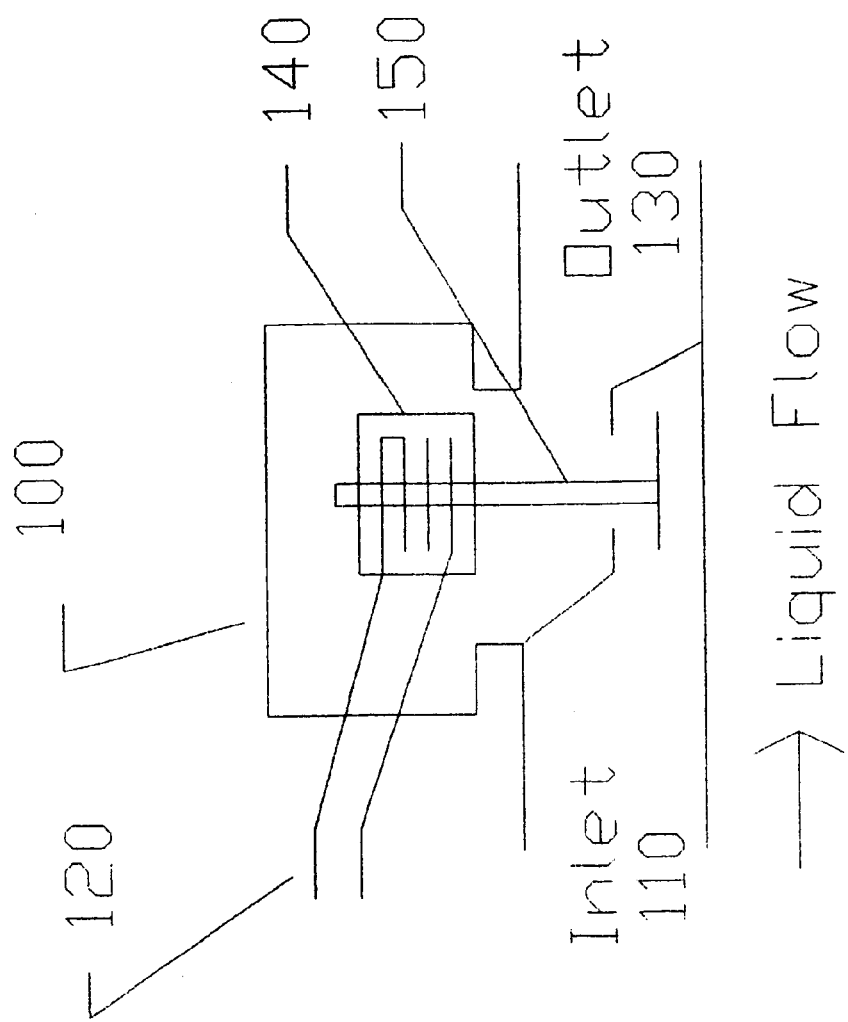
FIG. 1 is a drawing of a solenoid-controlled valve as used in prior art
Figure 2:
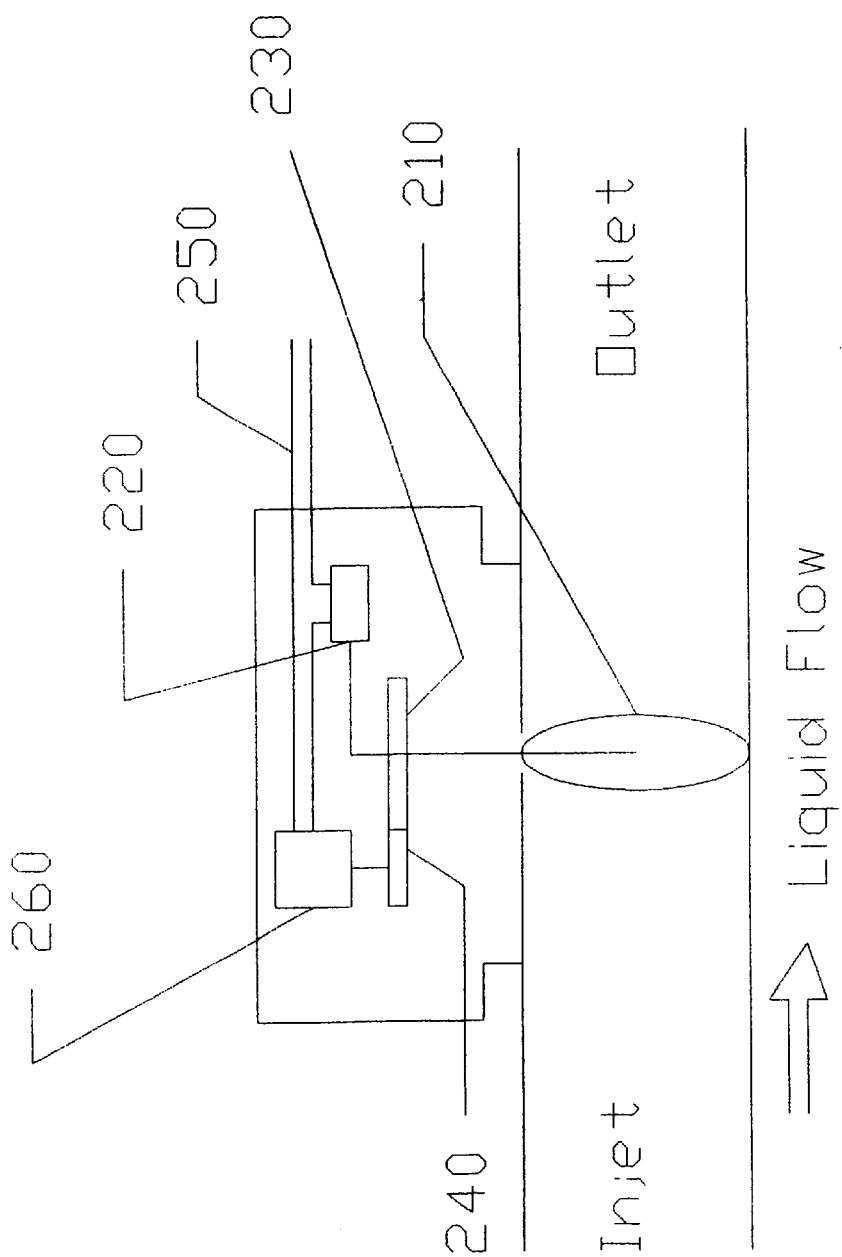
FIG. 2 is a drawing of a motor driven valve as used in prior art
Figure 3:
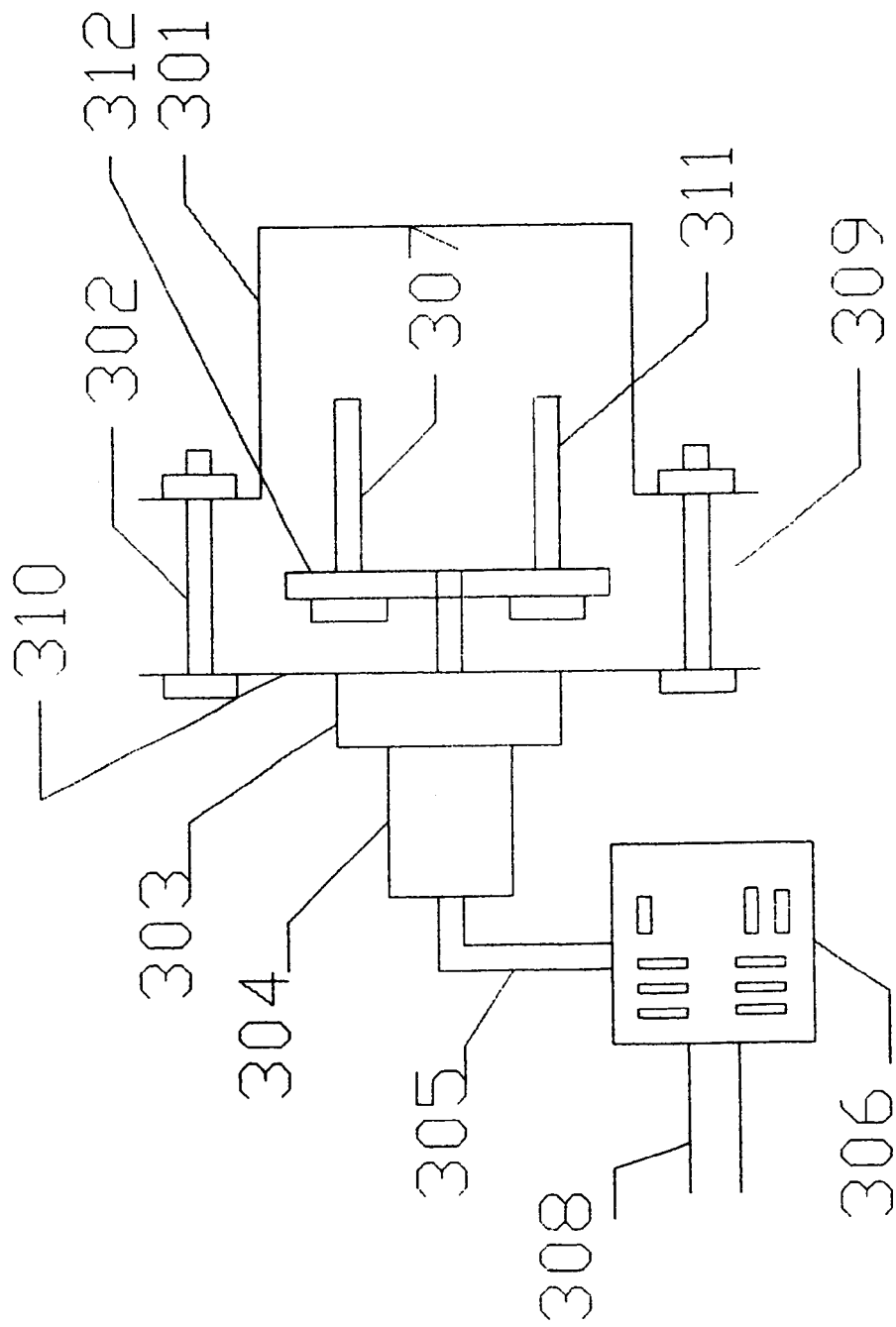
FIG. 3 is a drawing of certain elements of the invention including the motor controller, the motor, a gear drive, the motor mount, and a means to transfer torque from the motor using drive studs.
Figure 4:
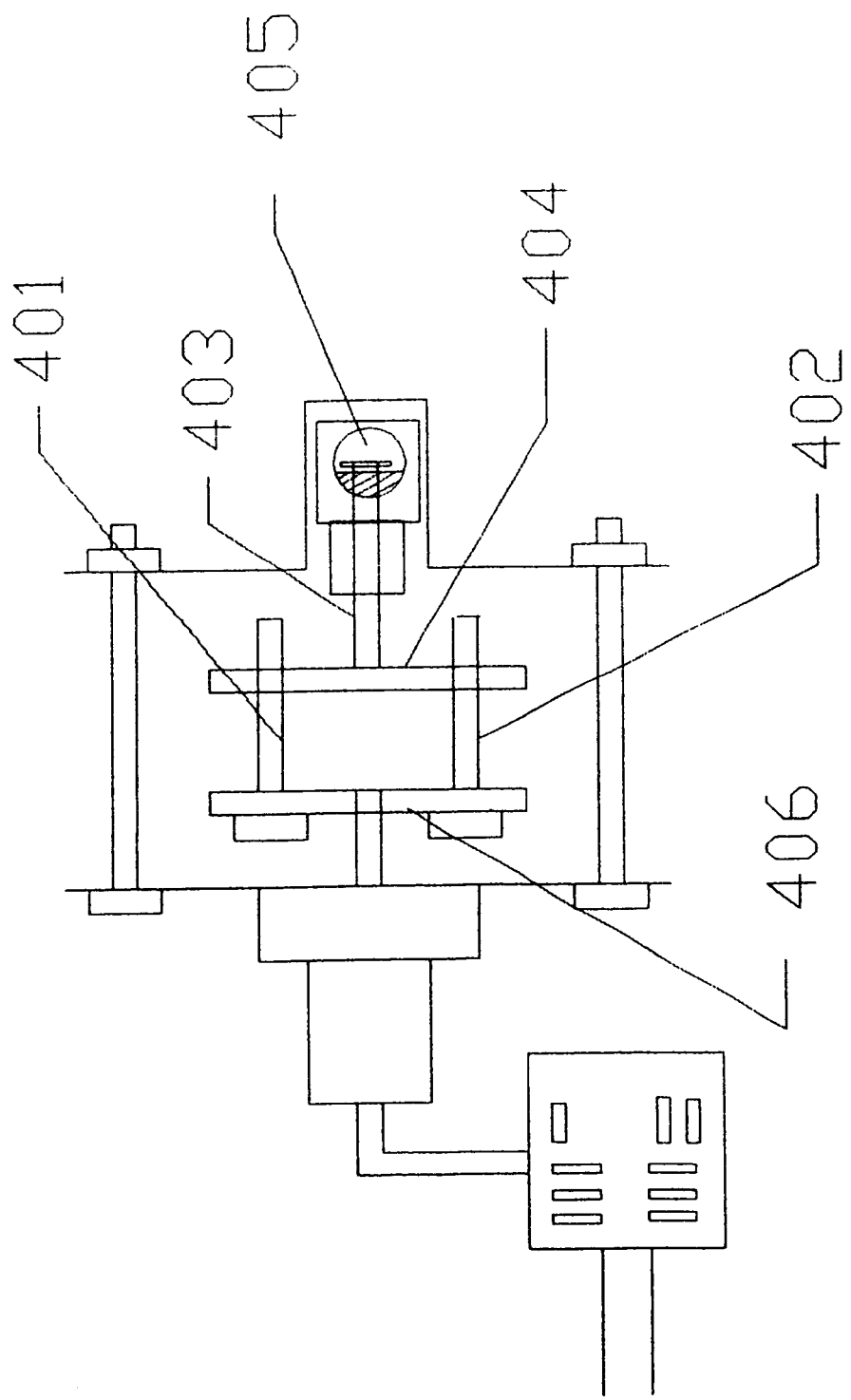
FIG. 4 shows the invention connected to a standard pre-mounted washer valve.
Figure 5:
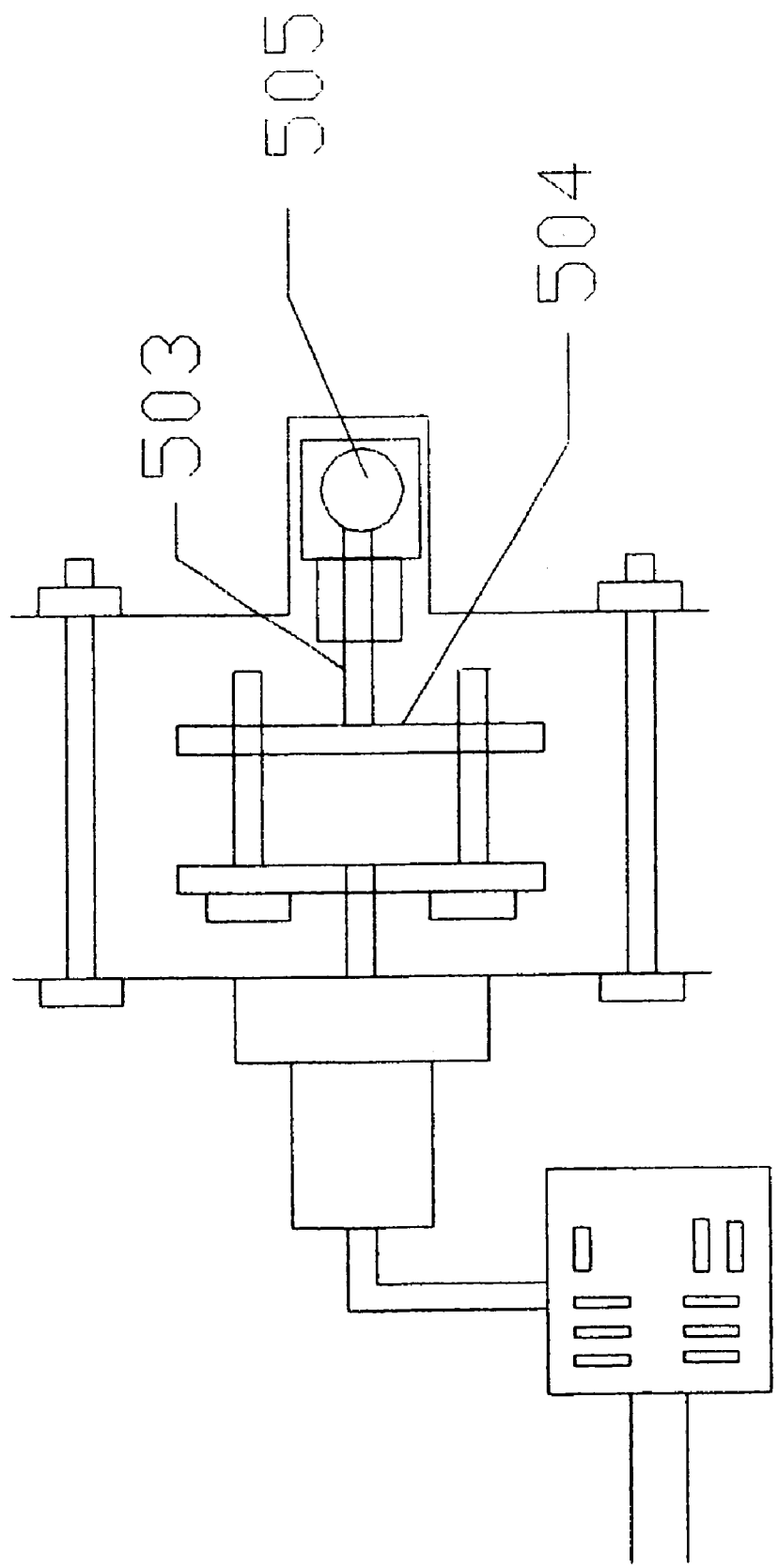
FIG. 5 shows the invention mounted to a standard gate valve. The gate is shown open.
Figure 6:
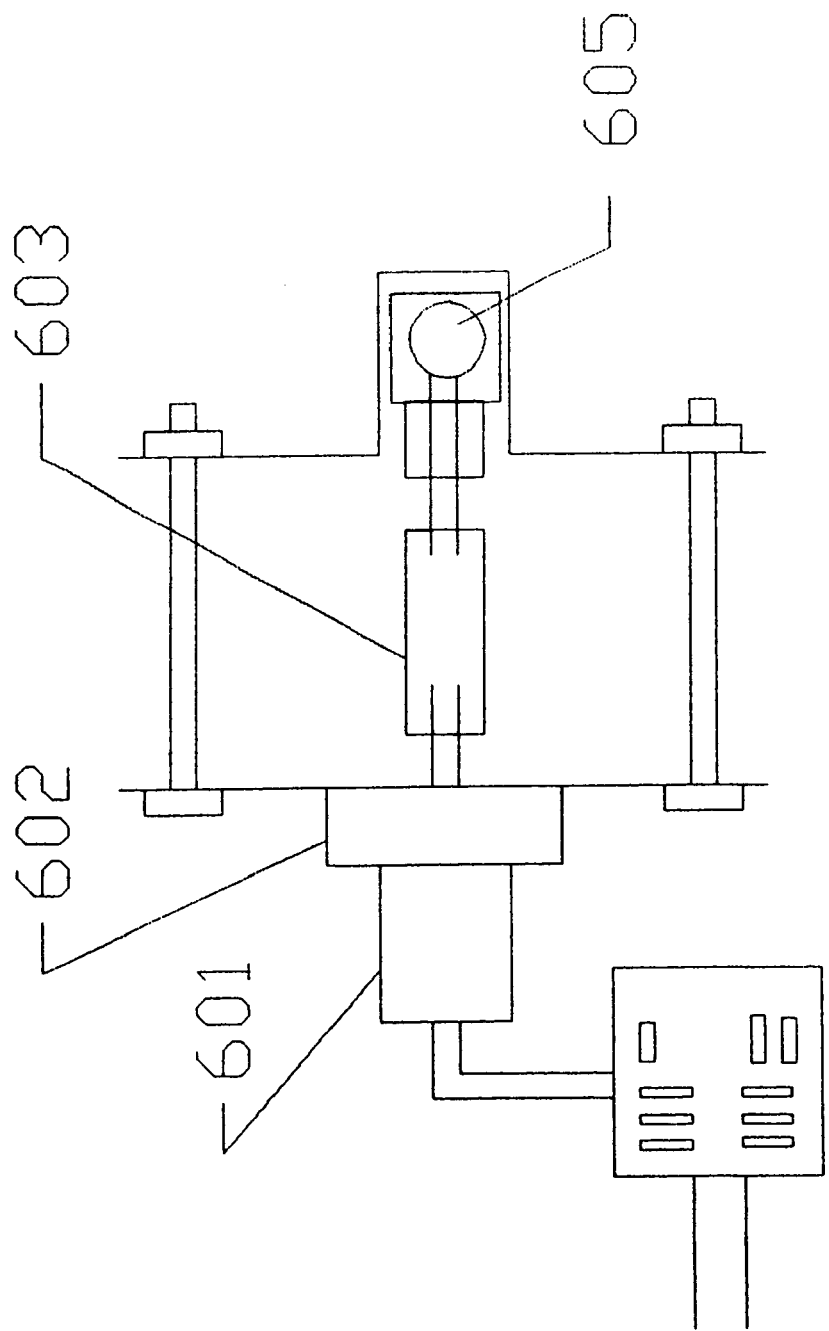
FIG. 6 shows the invention mounted to a gate or washer valve using a cylindrical coupling device.
Figure 7:
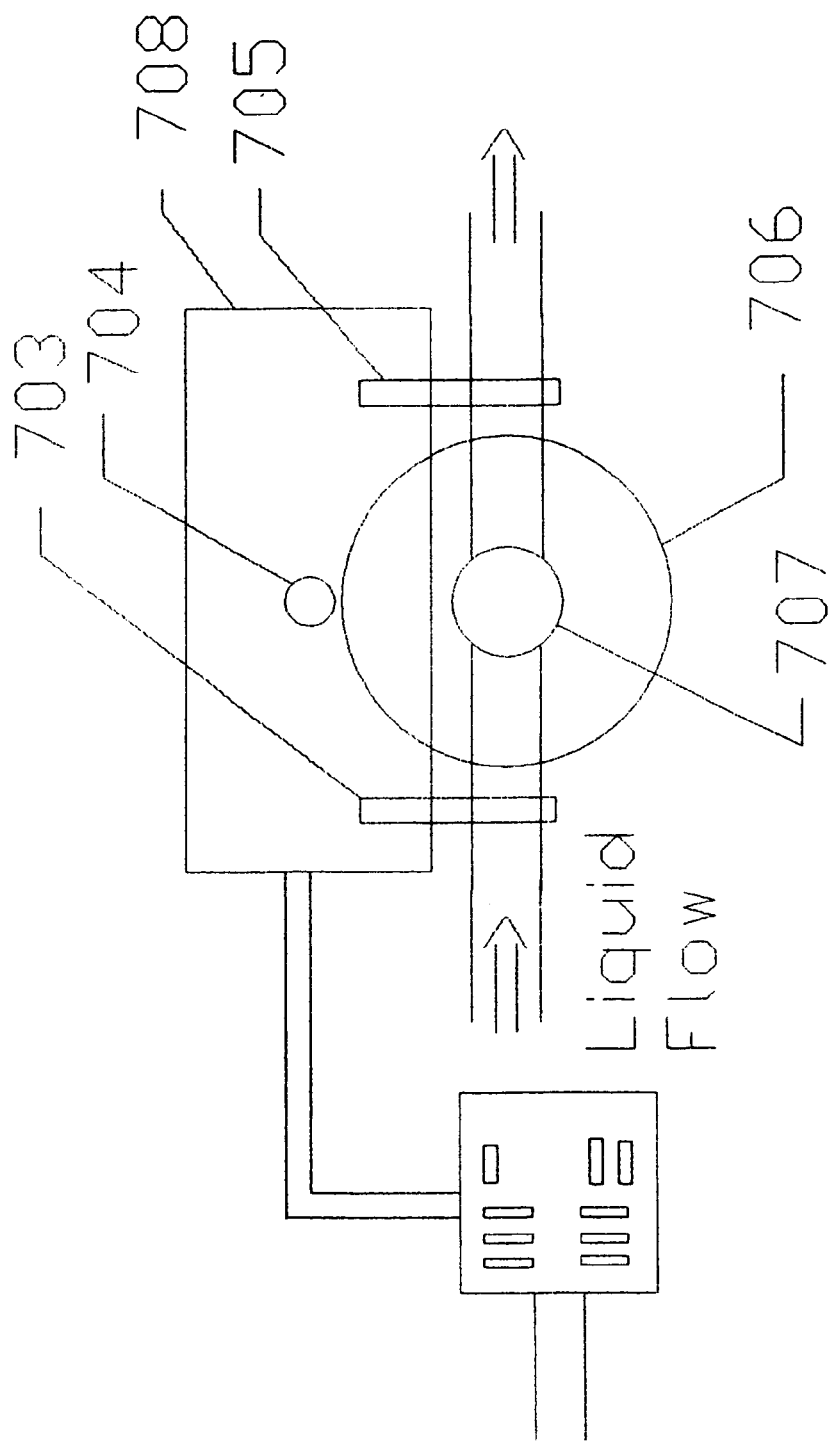
FIG. 7 shows the invention mounted to a gate or washer valve using a gear drive approach.
Figure 8:
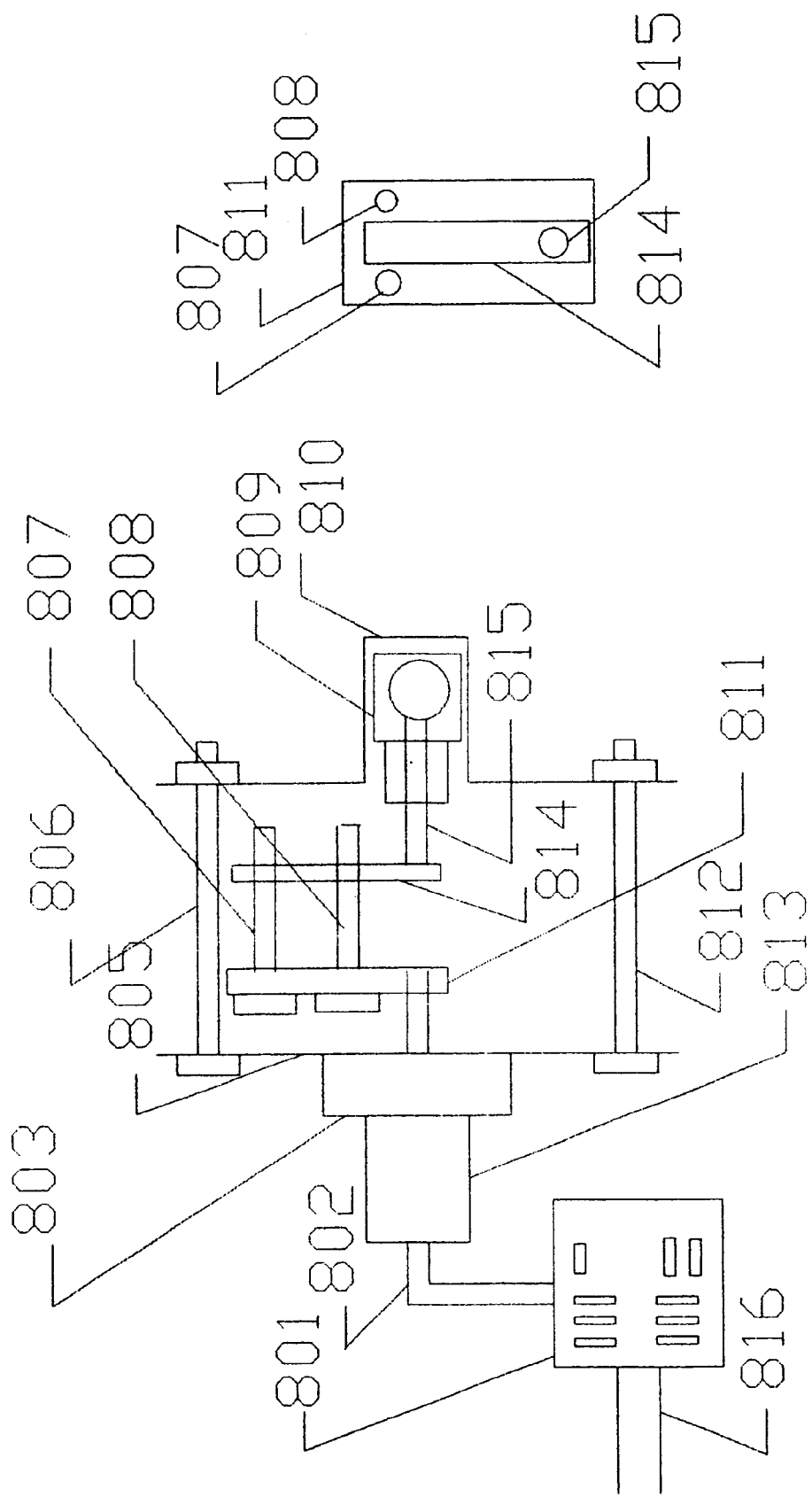
FIG. 8 shows the invention mounted to a ball valve.
Figure 9:
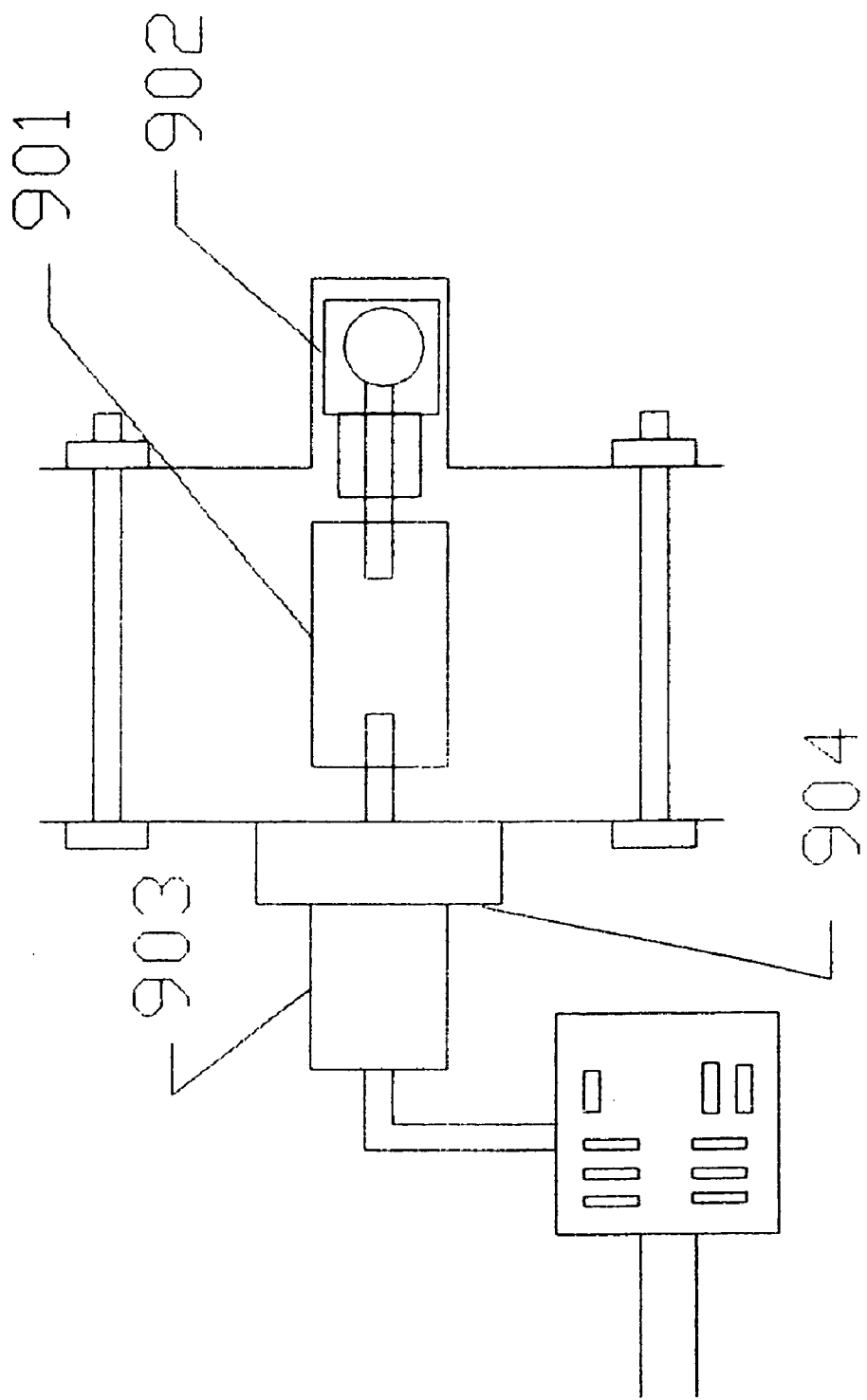
FIG. 9 shows the invention mounted to a ball valve using a cylindrical coupling approach.
Figure 10:
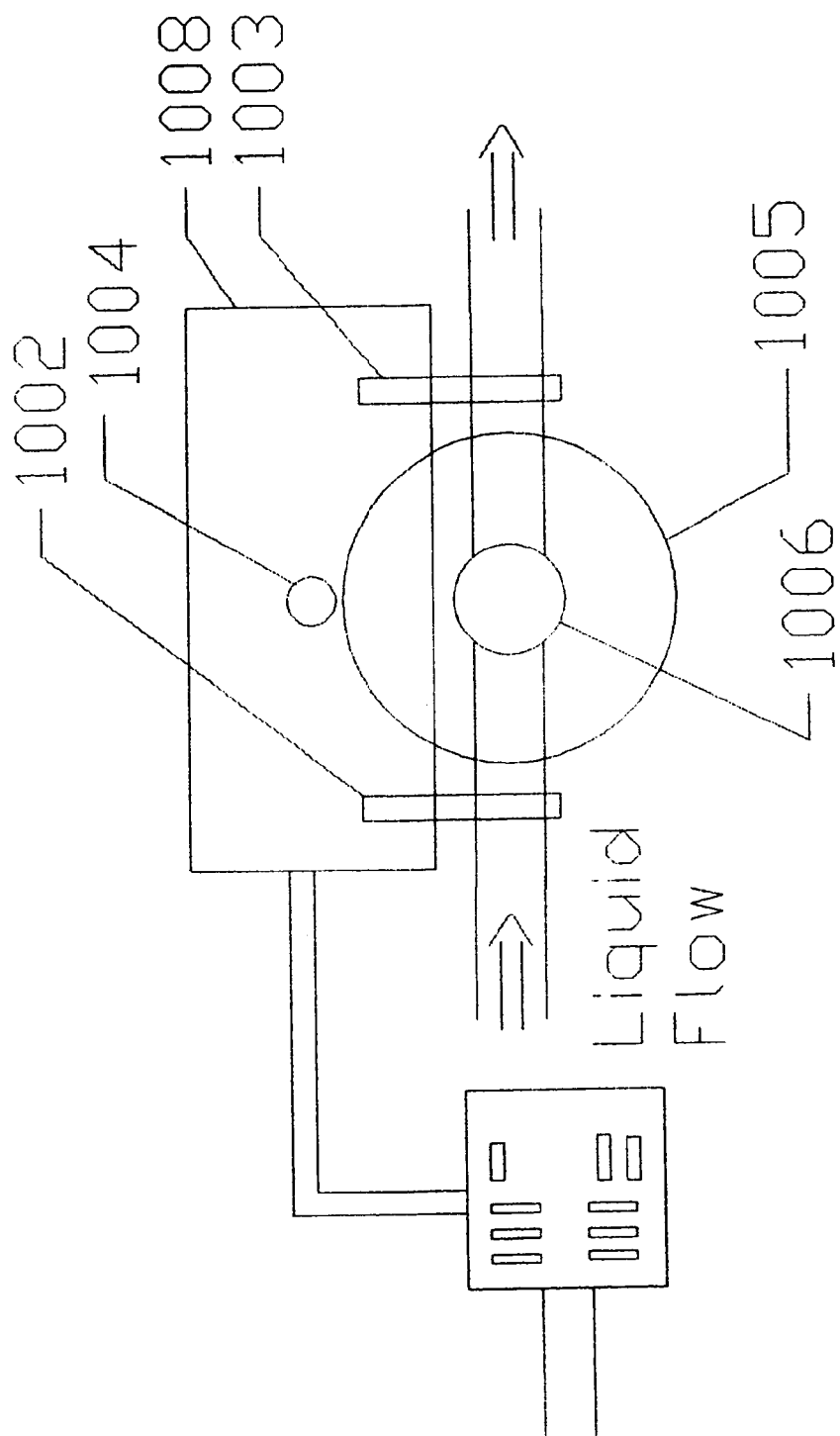
FIG. 10 shows the invention mounted to a ball valve using a gear drive approach.
Figure 11:
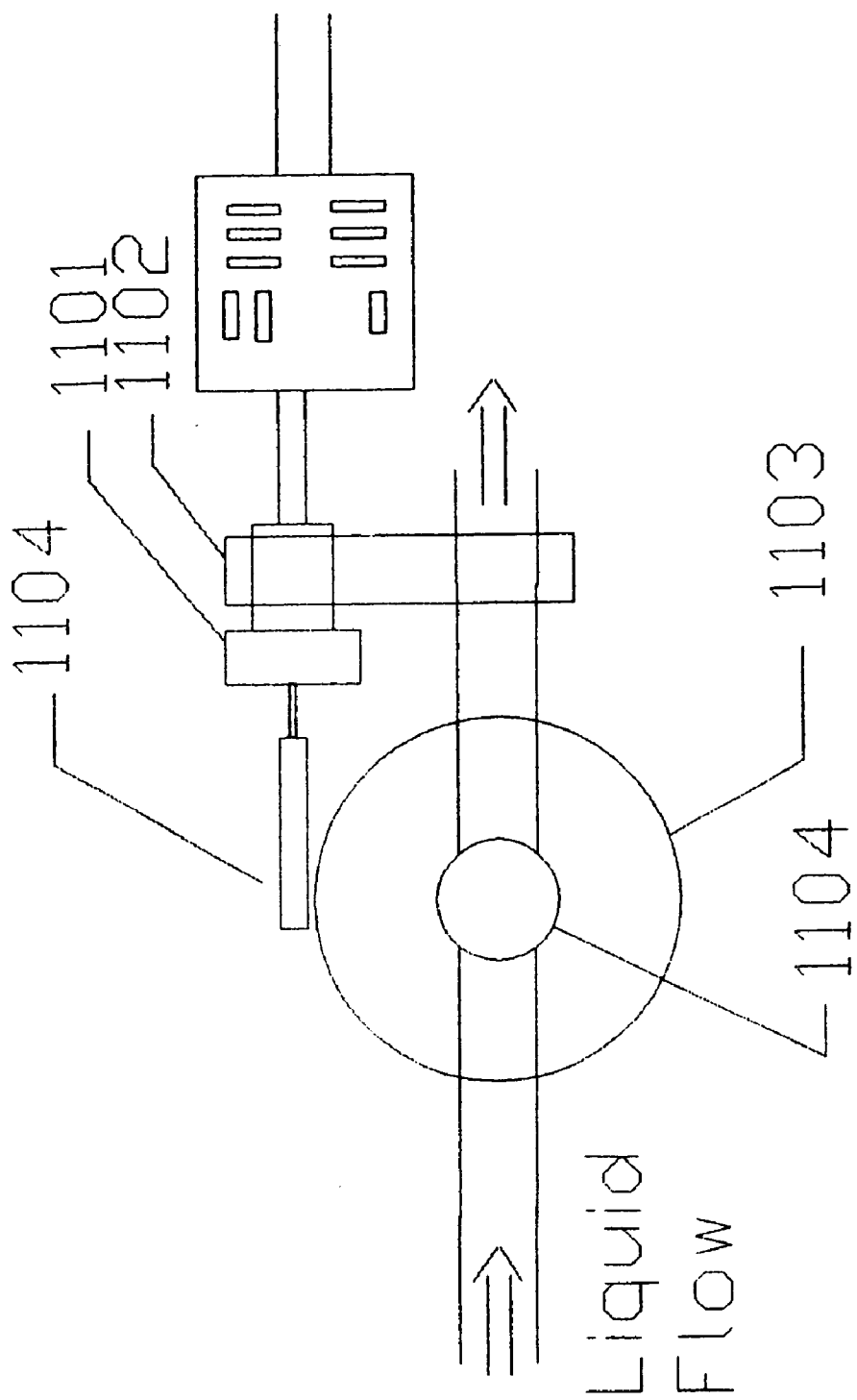
FIG. 11 shows the invention mounted to a valve using a worm gear drive approach.
Figure 12:
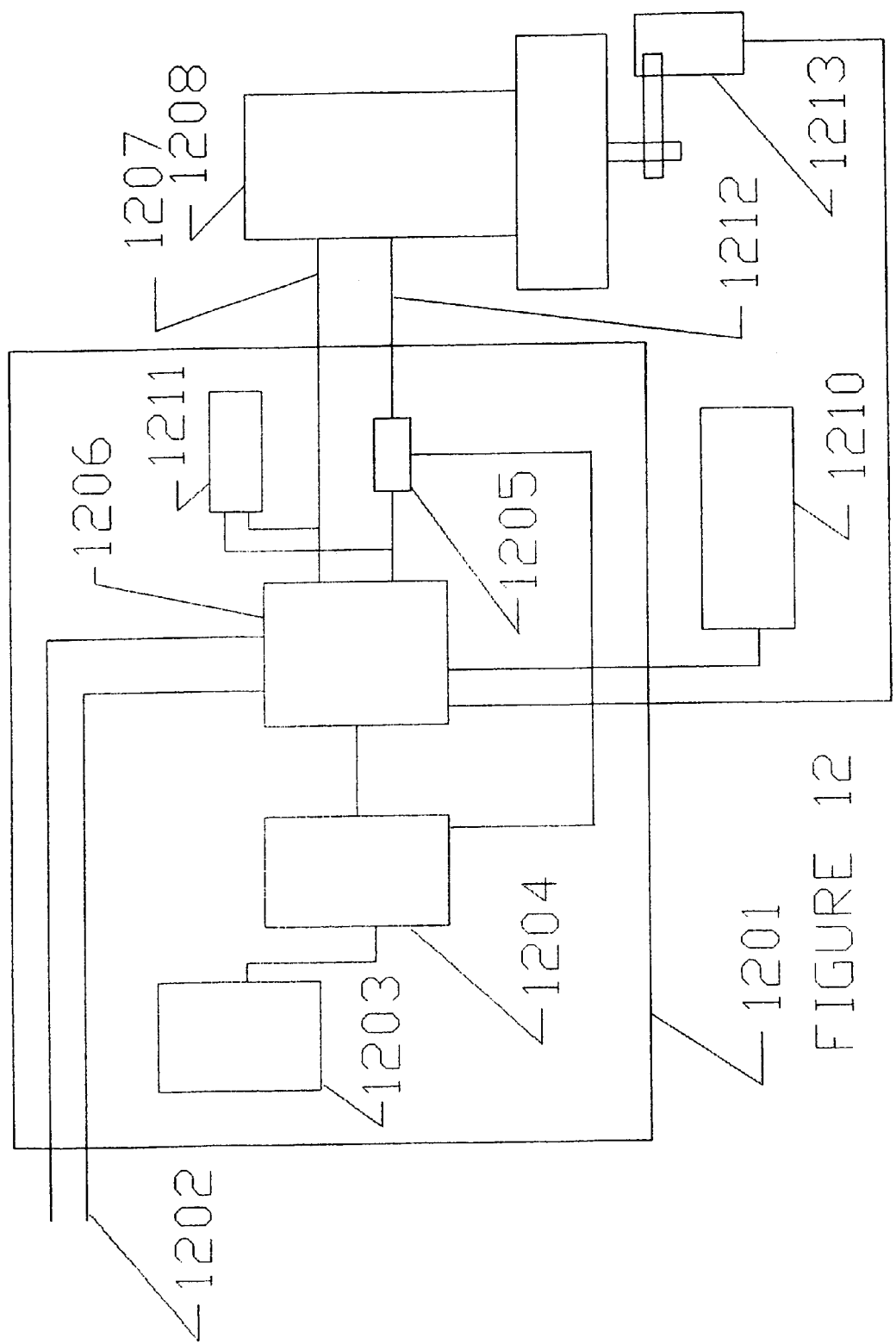
FIG. 12 is a block diagram of the motor controller including user interfaces.
Figure 13:
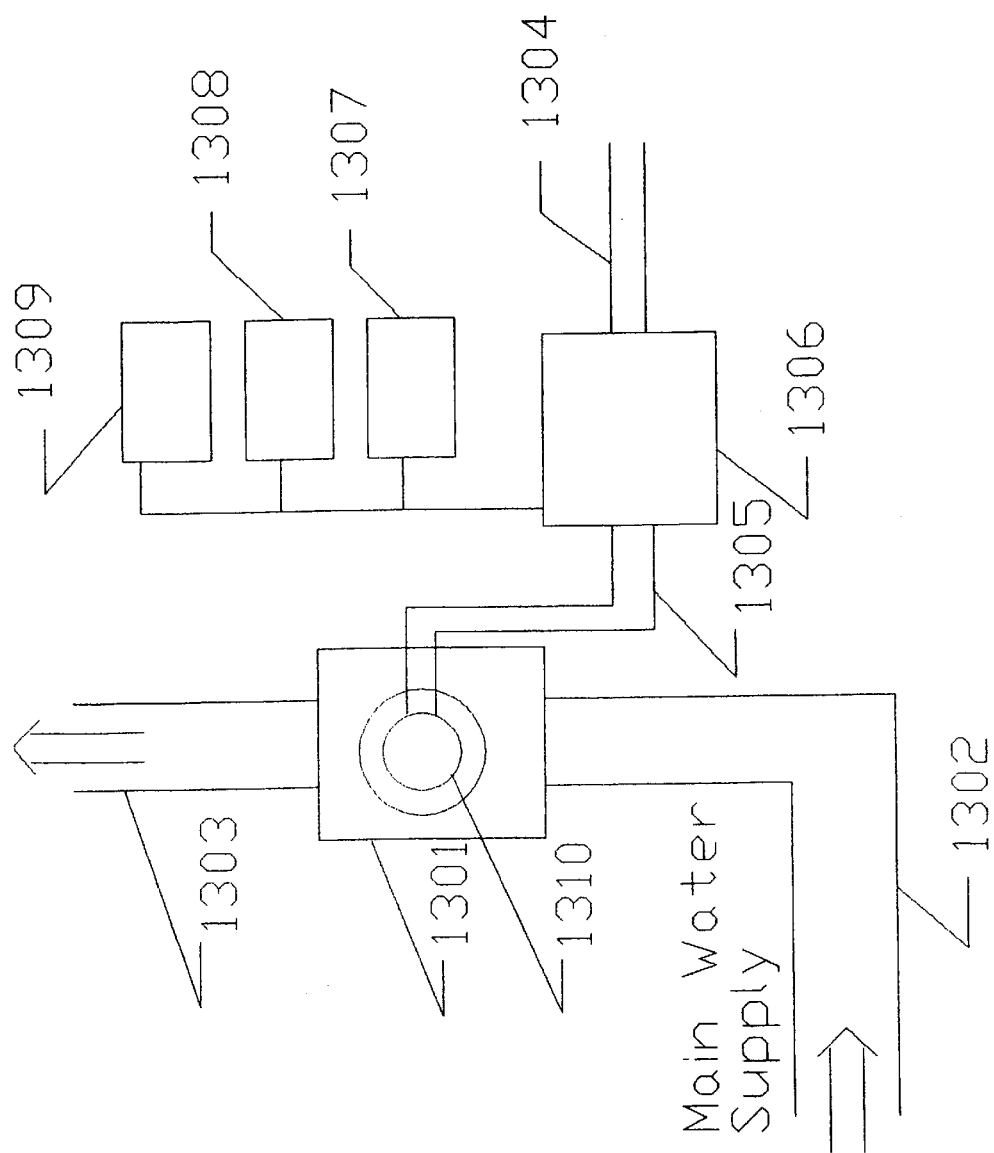
FIG. 13 is a block diagram of the invention to show various elements that can interface to the motor controller to control the motor to turn the main valve that supplies water to a building on and off.
Figure 14:
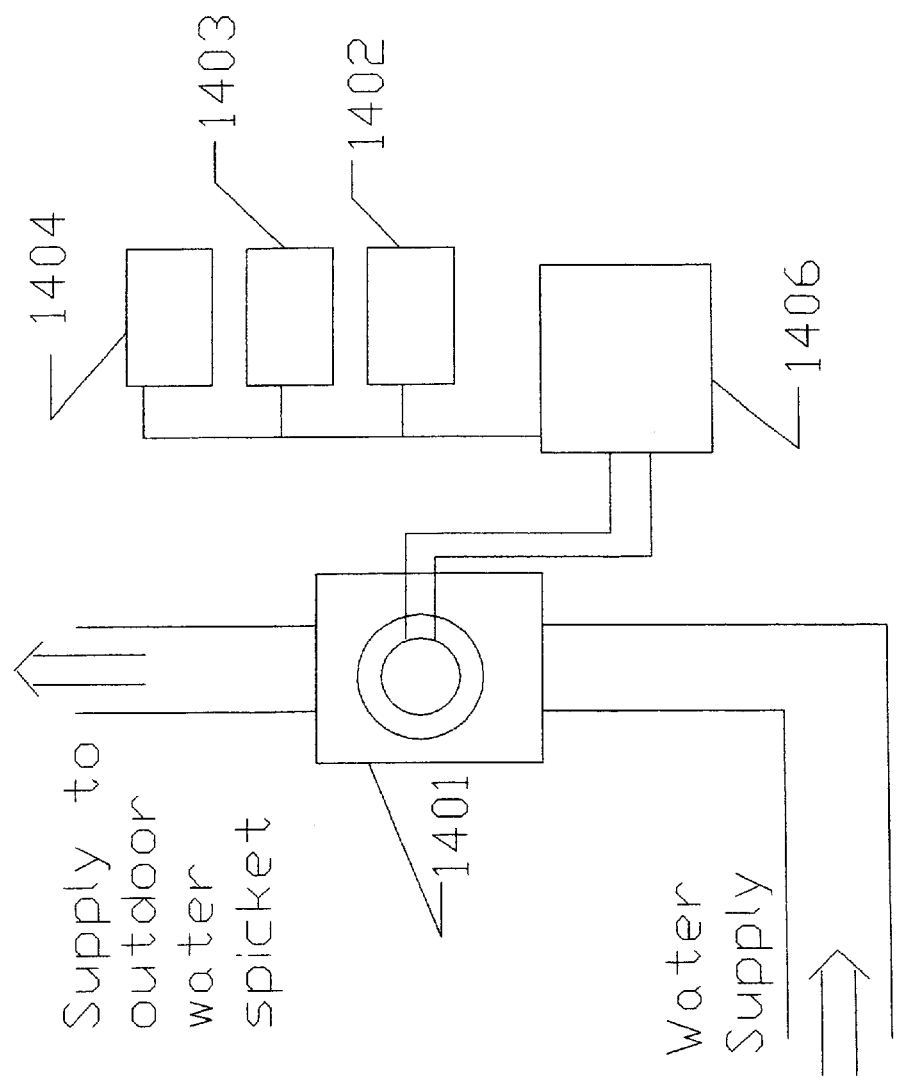
FIG. 14 is a block diagram of the invention to show various elements that can interface to the motor controller to control the motor to turn a valve that controls water flow to an outdoor water supply on and off.
Figure 15:
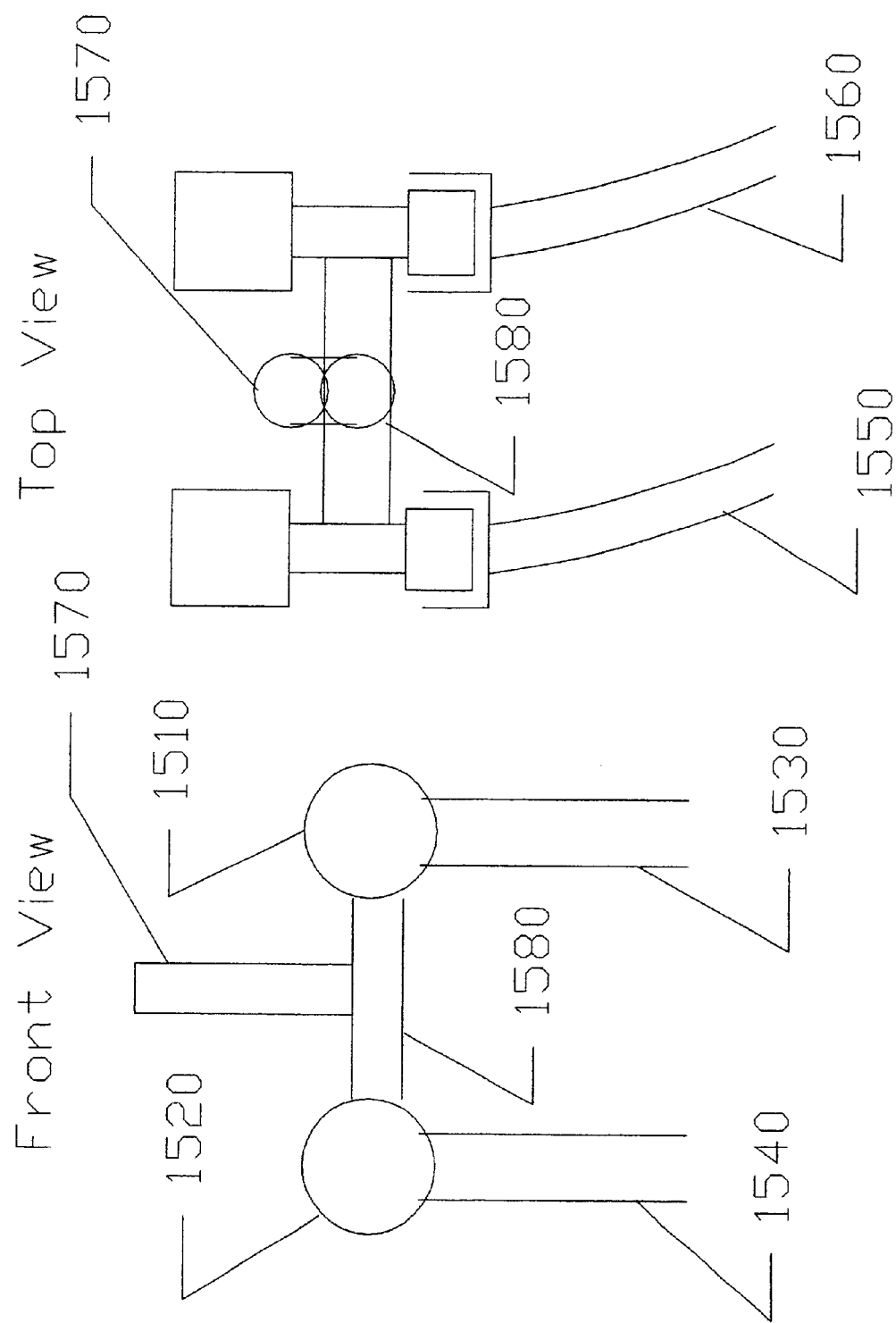
FIG. 15 illustrates a multiple valve assembly with a single controlling lever such as that used to control hot and cold water to an appliance.
Figure 16:
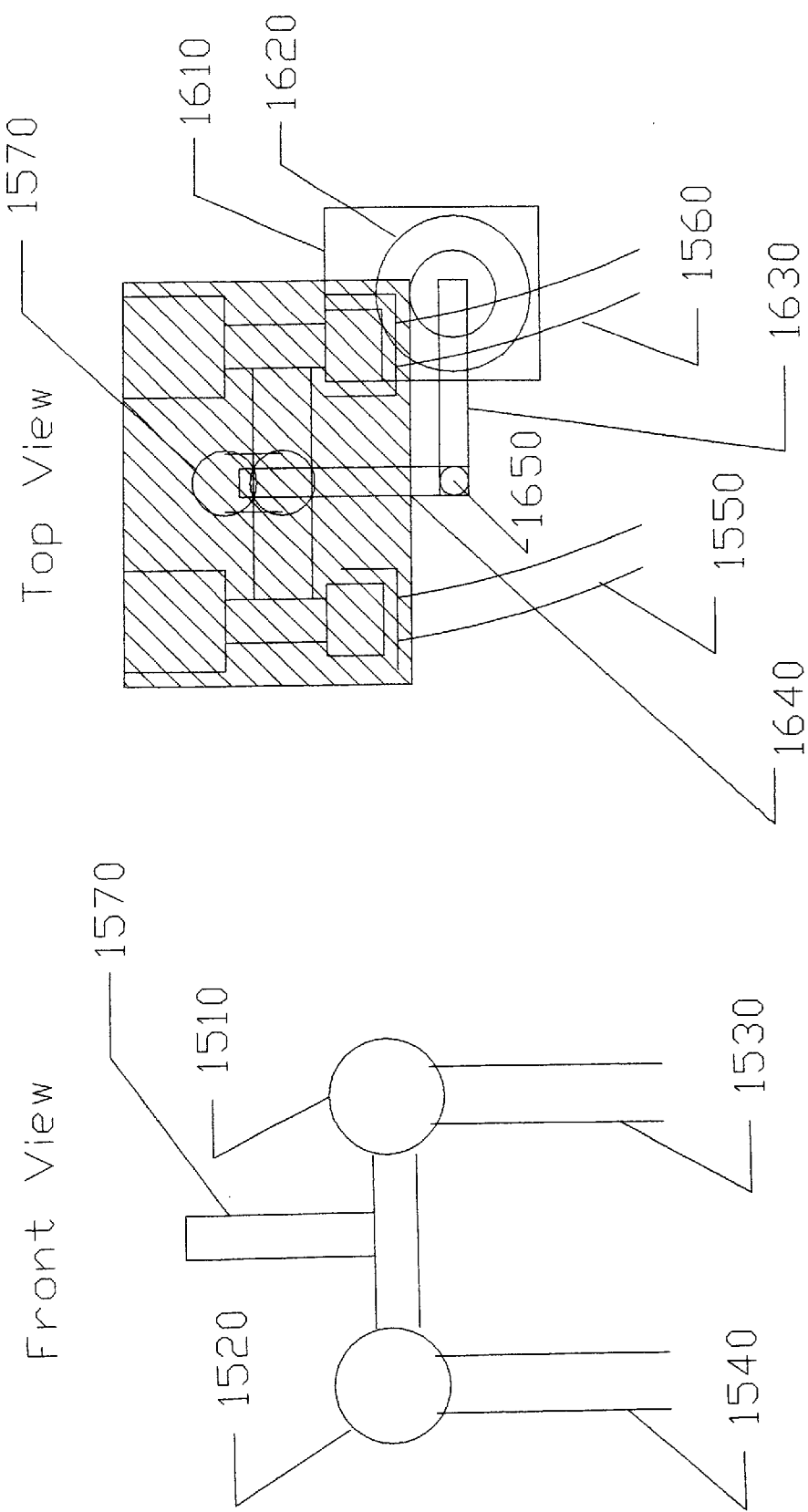
FIG. 16 shows the invention mounted to a multiple valve assembly.
Figure 17:
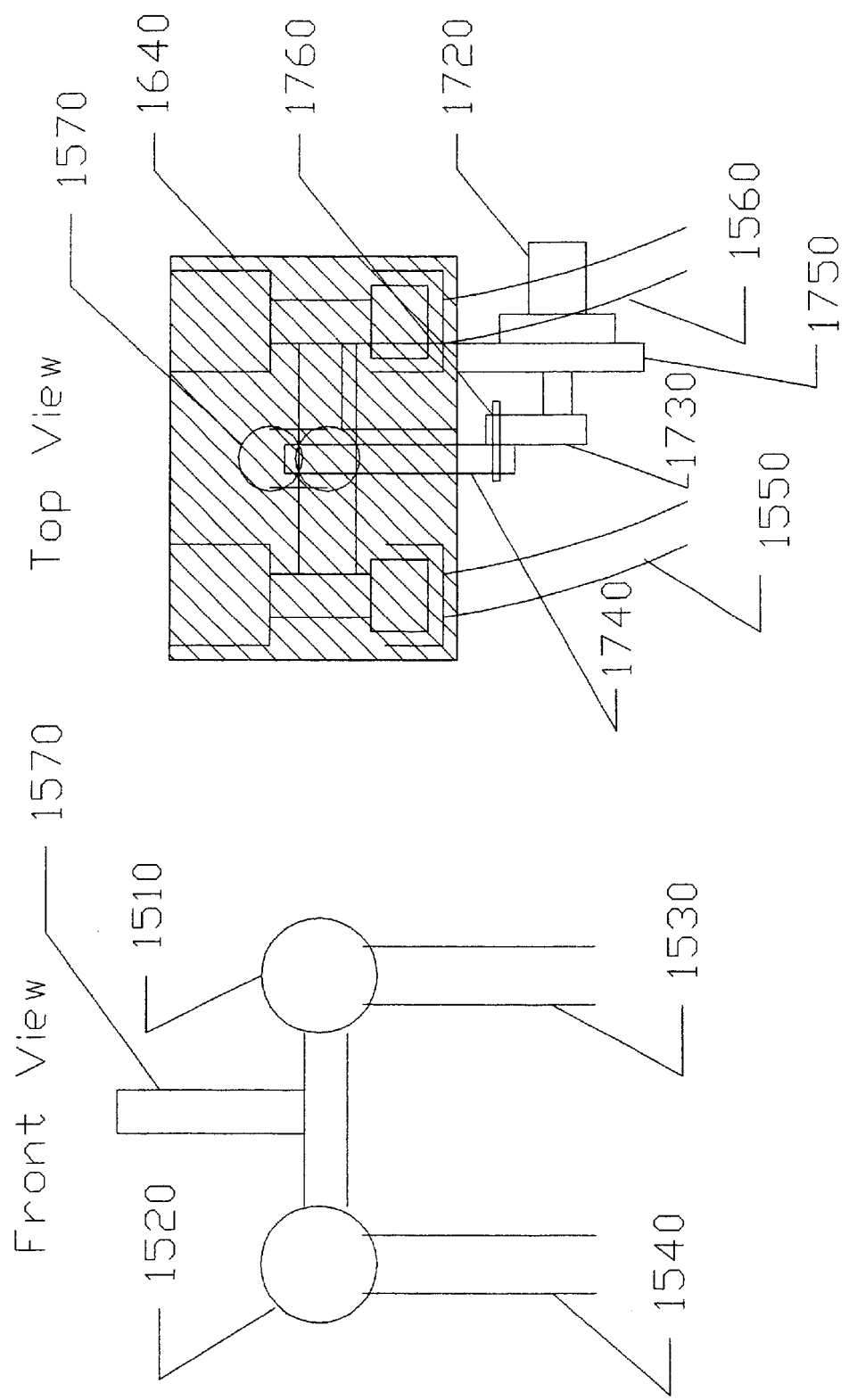
FIG. 17 shows an alternative means to mount the invention to a multiple valve assembly.

Figure one and two show the current state of the art for electronically controlled valves. Figure one illustrates a solenoid actuated valve. Moving plunger 150 controls liquid flow from the inlet 110 to the outlet 130. Current passing through wires 120 actuates solenoid coil 140. Solenoid coil 140 moves plunger 150 such that plunger 150 either blocks the flow of water or does not block the flow of water. The valve can be constructed so that liquid flows when current passes through wires 120 or does not flow when current passes through wires 120.

Figure two illustrates a motor controlled valve. This assembly includes a motor 260, a motor drive gear 240, connected to a valve gate drive gear 230, a valve monitoring switch 220, a gate 210, and power wires 250. The motor 260 gears 230 and 240, and monitoring switch 220 can be constructed so that liquid flows when current passes through the power wires 250 or does not flow when current passes through the power wires 250.

Valves of the type in Figures one and two are available in many forms from a variety of manufactures. They cannot be used to convert an existing manually controlled valve into an electronic valve. To make such a conversion, the electronically controlled valve must be attached to the pipes servicing the valve. Attaching such a valve usually requires a plumbing expense that exceeds the cost of the valve. A preferred approach would be to have a valve control system that easily mounts to an installed valve. A secondary benefit of separating the motor drive from the valve is to provide a system that converts standard commercial high volume inexpensive valves into electronically controlled valves.

The invention described provides such a system.

Figure three, one preferred embodiment of the invention, shows a motor, drive, and control assembly that can be mounted to a variety of valve types. Figure three includes motor 304, drive 303, drive connector 312, drive couplers 307 and 311, controller 306, mounting bracket 301, mounting studs 302, 309, motor mount 310, motor control wires 305, and power wires 308. Motor 304 is connected to drive connector 312 through drive 303. Drive 303 serves to reduce the speed and increase the torque of motor 304. Drive 303 can be eliminated if the motor is designed to produce relatively high torque at low speeds. Drive connector 312 transfers rotary motion from drive 303 to the controlled valve using drive couplers 307 and 311. Mounting bracket 301 is mounted behind the controlled valve and connected to motor mount 310 using mounting studs 302 and 309. Drive connector 312 and drive couplers 307 and 311 transfer rotary motion to a standard valve handle. To prevent damaging the valve under fault conditions, drive couplers 307 and 311 can be designed to break at a stress level that is lower than a level that will break the valve. Thus the entire system can be easily assembled to a valve that is mounted to the pipes servicing the valve without the need to disturb the plumbing. Controller 306 provides power and control to motor 304 through wires 305. Motor controller 306 receives power from power wires 308. Motor controller 306 controls the rotational direction of motor 304. Motor controller 306 controls motor 304 based upon one or more of the following:

user programming current demanded by motor 304 the volt time product or current time product required to drive motor 304 to turn on or off the controlled valve any other means to turn on and off the controlled valve Figure four shows the assembly described above mounted to a standard washer type valve 405. In this embodiment, the length of the drive couplers 401 and 402 compensate for the up and down movement of the valve stem 403 and valve handle 404.

Figure five shows the assembly mounted to a standard gate valve 505. This motor drive assembly is similar to the one shown in Figure four. However, the valve stem 503 and valve handle 504 do not move up and down for this valve type.

Figure six shows an alternative embodiment. The torque produced by motor 601 is transferred through drive 602 to valve 605 through a coupling device 603. The coupling device 603 directly couples drive 602 to valve 605. Coupler 603 of Figure six replaces the function of drive connector 406 and drive couplers 401 and 402, of Figure four. To prevent damaging the valve under fault conditions, coupler 603 can be designed to break at a torque that is lower than a torque that will break the valve.

Figure seven shows another approach in which the motor drive transfers torque to valve 707 (hidden) through gears 704 and 706. Motor mount 708 is mounted to the water pipes using mounts 703 and 705.

Figure eight shows the assembly mounted to a ball valve. The drive connector 811 and drive couplers 807 and 808 differ from the prior embodiments illustrated in Figures four and five to accommodate the operation of the ball valve 809. Figure eight, a preferred embodiment of the invention, includes motor 813, drive 803, drive connector 811, drive couplers 807 and 808, controller 801, mounting bracket 810, mounting studs 806 and 812, motor mount 805, motor control wires 802, and power wires 816. Motor 813 is connected to drive connector 811 through drive 803. Drive 803 serves to reduce the speed and increase the torque of motor 813. This can be done using gear reduction or other known techniques. Drive 803 is not necessary if the motor is designed to produce high torque at low revolutions per minute. Drive connector 811 transfers rotary motion from drive 803 to the controlled valve 809 using the drive couplers 807 and 808. Mounting bracket 810 is mounted behind the controlled valve 809 and connected to motor mount 805 using mounting studs 806 and 812. Drive connector 811 and drive couplers 807 and 808 transfer rotary motion to a standard valve handle of the type normally found on a ball valve. To prevent damaging the valve under fault conditions, drive couplers 807 and 808 can be designed to break at a torque that is lower than a torque that will break the valve. Thus the entire system can be easily assembled to a ball valve that is mounted to the pipes servicing the valve without the need to disturb the plumbing. Controller 801 provides power and control to motor 813 through wires 802. Motor controller 801 receives power from power wires 816. Motor controller 801 controls the rotational direction of motor 813.

Figure eight also shows a detail of the method used to couple drive connector 811 to ball valve handle 814. The ball valve handle 814 is secured to the valve stem 815 using standard techniques. Drive connector 811 mounts up against ball valve handle 814. Drive connector 811 moves gate valve handle 814 in a rotary direction using drive couplers 807 and 808. Drive couplers 807 and 808 are mounted on opposite sides of ball valve handle 814 such that drive coupler 807 pushes against ball valve handle 814 to move it in a clockwise direction and drive coupler 808 pushes against gate valve handle 814 to move it in a counter-clockwise direction. To prevent damaging the valve under fault conditions, drive couplers 807 and 808 can be designed to break at a stress level that is lower than a level that will break the valve.

Figure nine shows an alternative embodiment for the ball valve. The torque produced by motor 903 is transferred through drive 904 to valve 902 through a coupling device 901. The coupling device 901 directly couples drive 904 to valve 902. Coupler 901 of figure nine replaces the function of drive connector 811 and drive couplers 807 and 808, of figure eight. To prevent damaging the valve under fault conditions, coupler 901 can be designed to break at a torque that is lower than a torque that will break the valve.

Figure ten shows another approach in which the motor drive transfers torque to a gate valve 1006 (hidden) through gears 1004 and 1005. Motor mount 1008 is mounted to the water pipes using mounts 1002 and 1003.

Figure eleven illustrates an embodiment for the washer, ball, or gate valves using a worm drive configuration. For this configuration, worm drive gear 1104 is mechanically coupled to gear 1103 to turn valve 1104 (hidden) on and off. Motor 1101 drives worm gear 1104. Mounting bracket 1102 secures motor 1101 to the pipe.

Figure twelve is a block diagram representation of one possible embodiment of the motor control. For this embodiment, motor control 1201 consists of timer circuit 1203, current sense circuit 1205, voltage sense circuit 1211, motor current control switch 1206, logic driver 1204, position sensor 1213 and user interface 1210. Motor control 1201 provides voltage to motor 1208 through wires 1207 and 1212. Motor 1208 can be of the type such that the motor turns in one direction (clockwise for purposes of this discussion) when wire 1207 is positive with respect to wire 1212 and the opposing direction (counter-clockwise) when wire 1212 is more positive than 1207. In this example the clockwise direction turns the valve on and the counter-clockwise direction turns the valve off.

Motor control 1201 directs current flow based upon one or more of the following:

The current flowing through motor 1208

The last direction of rotation of the motor

The time required to turn on or off the controlled valve

The volt time product to turn the valve on or off

The current time product to turn the valve on or off

The position of position sensor 1213

User interface 1210

Figure thirteen shows one potential application of the invention. In this embodiment, the motor controlled valve 1301 (hidden) is the main shut off to a building. Motor control 1306 includes an occupancy sensor 1307. Motor control 1306 turns valve 1301 on when building occupancy is sensed and off when building occupancy is not sensed. A delay can be added so that valve 1301 (hidden) is turned off after a pre-selected period after no occupancy is sensed in the building. Alternatively, a delay can be added that keeps the valve on for a pre-selected time after occupancy is sensed in the building. The motor drive can also contain circuitry that turns the valve on for short periods of time at specific intervals. This feature is useful under certain circumstances where equipment in the residence such as boilers, ice-cube makers, humidifiers, etc must be refurbished with water. The motor drive circuit can also include an override function to turn on the valve as required to operate other types of appliances such as lawn sprinklers. The valve would shut of concurrently with the equipment to minimize any damage done if a break had occurred in the water distribution system. The motor controller can also respond to a moisture detector 1308, or other sensing mechanism 1309. The motor controller can be set to turn on the valve using wires 1304 during periods when water is needed such as when a sprinkler system or outdoor spigot is turned on.

Figure fourteen illustrates a second application of the invention. In this embodiment, the motor controlled valve 1401 (hidden) is used to turn on and off water supply to an outdoor water spigot. Motor control 1406 turns valve 1401 on based upon a user interface. The user interface can be as simple as a switch 1402 or a more complicated timer 1403 or water supply measuring device 1404.

Figure fifteen shows a multiple valve assembly, in this case two valves, in which both valves are controlled by a single user interface, in this case a lever 1570. Pipe 1540 provides liquid to valve 1520 and pipe 1530 provides liquid to valve 1510. Coupler 1580 connects valve 1510 to valve 1520. Valve control lever 1570 is connected to coupler 1580 to turn valve 1510 and valve 1520 on and off. One implementation of this type of valve assembly is to turn the hot and cold water to a washing machine for cloths on and off. For this case hoses 1550 and 1560 connect the hot and cold water to the washing machine. However, this arrangement could be used to supply liquid to any machine or appliance.

Figure sixteen shows one method to couple a motor to the multiple valve assembly shown in figure fifteen. Motor 1620 is mounted to motor bracket 1610. Motor bracket 11610 is either an integral part of valve brace 1640 or is mounted to valve brace 1640 using any suitable fastening system. Valve brace 1640 is a box like structure that has a top and four sides. One of the sides is cut to accommodate hoses 1550 and 1560. The top has a slot that allows valve control lever 1570 to pass through and move freely. Valve brace 1640 is placed over the valve assembly such that hoses 1550 and 1560 pass through one of the sides and lever 1570 passes through the top. The valve brace braces the motor bracket to the valve assembly.

Lever 1630 is fastened to the motor shaft on one end and to coupler 1640 on the second end. One method to fasten lever 1630 to coupler 1640 is to use a pin such that the angle between lever 1630 and coupler 1640 can change as the motor rotates. The second end of coupler 1640 is fastened to valve control lever 1570 such that coupler 1640 transfers the rotary torque from lever 1630 to valve control lever 1570 in such a way as to turn the multiple valve assembly on and off.

Figure seventeen shows a second means to control valves 1520 and 1510 using the current invention. Motor 1720 is mounted to motor mount 1750. Motor mount 1750 is either an integral part of valve brace 1640 or is mounted to valve brace 1640 using any suitable mounting method. Motor 1720 is mounted to motor mount 1750 such that its shaft runs parallel and above the front of valve brace 1640. Lever 1730 is connected to motor 1720's shaft at one end so that it rotates with the shaft. The second end of lever 1730 is connected to one end of connecting rod 1740 using a pin or similar connecting device. The second end of connecting rod 1740 is fastened to valve control lever 1570 such that connecting rod 1740 transfers the rotary torque from lever 1730 to valve control lever 1570 in such a way as to turn the multiple valve assembly on and off.

The invention is not limited in any way to the applications discussed. The invention can be used to automatically control the flow of liquid or gas in any application. In particular, the methods described earlier to control an individual valve including sensing current, voltage, occupancy, position, and instructions from a user interface apply to the control of a multiple valve assembly.

What is claimed is:

1. A method for controlling a valve supplying water to an appliance, comprising the steps:

securing a housing about said valve and a pipe interconnected with said valve, wherein said housing has a motor mount and a mounting bracket with said valve and pipe disposed therebetween, and wherein said valve is located within a building;

coupling a motor to a handle of said valve, wherein said coupling is at least one drive coupler, wherein said motor is coupled to said motor mount and wherein said motor transfers rotary motion lo said handle said valve;

sensing when said appliance is on;

opening said valve when said appliance is on; and closing said valve when said appliance is off.

2. A device to automatically control a valve, comprising:

a motor;

at least one coupler to transfer torque from a shaft of said motor to a valve handle of said valve, thereby opening/closing said valve, wherein said valve is coupled to a pipe and located within a building;

a mounting system for securing said motor and said coupler and coupling to said valve handle such that said motor transfers said torque to said valve handle, wherein said mounting system is comprised of a motor mount plate and a mounting bracket with said motor secured to said motor mount plate, said mounting bracket opposing said motor plate, and with said pipe and valve disposed therebetween, and wherein said motor plate and said mounting bracket are fastened to each other and securely attached about said pipe;

a motor drive circuit controlling said motor; and a means for instructing said motor drive circuit to control said valve.

3. The device according to claim 2, wherein said valve is connected to a water supply pipe.

4. The device according to claim 2, further comprising a first gear coupled to said motor and a second gear coupled to said valve.

5. The device according to claim 2, wherein said coupler is at least two drive couplers engaging a handle of said valve.

6. The device according claim 2, wherein said means for instructing is a means for sensing current of said motor.

7. The device according to claim 2, wherein said means for instructing is a means for sensing voltage of said motor.

8. The device according to claim 2, wherein said means for instructing is a timer.

9. The device according to claim 2, wherein said means for instructing is a switch.

10. The device according to claim 9, further comprising a timer for measuring a time interval and opening said valve for a predetermined time interval when said switch is activated.

11. The device according to claim 2, further comprising a means for monitoring occupancy of said building, and wherein said means for instructing is based on said means for monitoring.

12. The device according to claim 11, further comprising a timer for measuring a time interval when said building is not occupied and closing said valve if unoccupied for a predetermined time interval.

13. The device according to claim 11, further comprising a timer for measuring a time interval and opening said valve for a predetermined time interval when said building is occupied.

14. The device according to claim 2, wherein said motor includes a gear assembly.

15. The device according to claim 2, wherein said coupler is designed to break at a stress level that is less than the stress level that would break said valve.

16. An apparatus to automatically control a plurality of valves with a common control actuator, comprising:

a mounting structure securably attached to said valves and to at least one pipe interconnected with said valves, and wherein said valves are located within a building;

a motor wherein said motor transfers rotary torque to said control actuator and wherein said control actuator open and close said valves;

a means for coupling said motor to said control actuator, wherein said means for coupling comprises a first lever secured on one end to a shaft of said motor and a second lever connecting to said actuator on one end and said first lever on a second end, said means for coupling further comprises a brace and a motor bracket with said valve disposed therebetween, said brace comprising a rectangular top plate and having four sides attaching to said top plate and wherein said motor is mounted to said bracket and said bracket is attached to said brace; and a means for controlling said motor to open and close said control actuator.

17. The apparatus according to claim 16, wherein said valve connects to an input water supply pipe.

* * * * *